(12) United States Patent
Kotz (10) Patent No.: US 9,315,129 B2
(45) Date of Patent: Apr. 19, 2016

(54) VEHICLE INTERIOR FITTING

(75) Inventor: Maximilian Kotz, Rieden (DE)

(73) Assignee: GRAMMER AG, Amberg (DE)

( * ) Notice: Subject to any disclaimer, the term of this patent is extended or adjusted under 35 U.S.C. 154(b) by 160 days.

(21) Appl. No.: 14/237,382

(22) PCT Filed: Aug. 17, 2012

(86) PCT No.: PCT/DE2012/000834
§ 371 (c)(1),
(2), (4) Date: Apr. 1, 2014

(87) PCT Pub. No.: WO2013/023642
PCT Pub. Date: Feb. 21, 2013

(65) Prior Publication Data
US 2014/0252835 A1    Sep. 11, 2014

(30) Foreign Application Priority Data
Aug. 17, 2011    (DE) .......................... 10 2011 110 389

(51) Int. Cl.
*B60N 2/48* (2006.01)
*B60N 2/46* (2006.01)
*B60N 2/44* (2006.01)

(52) U.S. Cl.
CPC .............. *B60N 2/4808* (2013.01); *B60N 2/443* (2013.01); *B60N 2/4646* (2013.01); *B60N 2/482* (2013.01); *B60N 2/4829* (2013.01); *B60N 2002/4894* (2013.01)

(58) Field of Classification Search
CPC .. B60N 2/4808; B60N 2/4829; B60N 2/4646; B60N 2/482; B60N 2/443; B60N 2002/4894

USPC ............... 297/405, 410, 411.36, 411.37, 409
See application file for complete search history.

(56) References Cited

U.S. PATENT DOCUMENTS

| | | | | | |
|---|---|---|---|---|---|
| 18,122 | A | * | 9/1857 | McCauley | ..................... 297/399 |
| 2,306,334 | A | * | 12/1942 | Costas | ........................ 297/407 |
| 3,086,824 | A | * | 4/1963 | Barkley | ........................ 384/43 |
| 4,854,632 | A | | 8/1989 | Kreuze | |
| 5,222,784 | A | | 6/1993 | Hamelin | |
| 6,572,189 | B1 | * | 6/2003 | Blaymore | ................ 297/256.12 |
| 2010/0127541 | A1 | | 5/2010 | Kotz | |

FOREIGN PATENT DOCUMENTS

| | | | |
|---|---|---|---|
| DE | 003900495 A1 | * | 7/1990 |
| DE | 10307481 A | | 9/2004 |
| EP | 1588892 A | | 10/2005 |
| EP | 1859977 A | | 11/2007 |

* cited by examiner

*Primary Examiner* — Milton Nelson, Jr.
(74) *Attorney, Agent, or Firm* — Andrew Wilford

(57) ABSTRACT

A vehicle interior fixture has first and second elements movable relative to each other by an adjuster that is carried on the first element and that has at least one passage and a row or string of solid bodies in contact with one another, guided in and extending along the passage, and movable relative to the passage. At least one of the solid bodies bears on the second element. A drive element engaging the row or string of solid bodies at a location offset from the one body bearing on the second element is movable for pushing the row or string and thereby transmitting force by compression through the row or string to the one body and the second element to displace same.

11 Claims, 9 Drawing Sheets

VEHICLE INTERIOR FITTING

CROSS REFERENCE TO RELATED APPLICATIONS

This application is the US-national stage of PCT application PCT/DE2012/000834 filed 17 Aug. 2012 and claiming the priority of German patent application 102011110389.2 itself filed 17 Aug. 2011.

FIELD OF THE INVENTION

The invention relates to a vehicle interior fixture. A vehicle interior fixture of this type can be, for example, a headrest or armrest.

BACKGROUND OF THE INVENTION

A headrest is well-known in the prior art that includes a height-adjustment mechanism. Adjustment of a movable head-support part relative to a fixed support-rod base part is effected for example by an electric motor in this headrest, where gear teeth of the base part and of the movable head-support part mesh with each other. This otherwise advantageous adjustment mechanism needs improvement in terms of its space requirement and the flexibility of the arrangement within the movable head-support part.

OBJECT OF THE INVENTION

The object of the invention is therefore to create a vehicle interior fixture comprising an adjustment mechanism that requires little space and that can be adapted very flexibly to the available space within the vehicle interior fixture.

SUMMARY OF THE INVENTION

The vehicle interior fixture comprises a first element supported so as to be movable relative to a second element. The support can be via a slide bearing. The first element can be moved relative to the second element by an adjustment mechanism. For example, the vehicle interior fixture is a headrest that includes at least one backrest-anchored support rod and a movable head-support part that can be adjusted vertically on the support rod. The movable head-support part can, for example be mounted so as to be vertically adjustable along the support rod. In an alternative embodiment, for example the support rod can move relative to the backrest. In another alternative, the movable head-support part can be moved roughly horizontally relative to a base part of the headrest, i.e. toward or away from the head of the seat occupant.

The adjustment mechanism is formed with a passage that is associated with the first element. The passage can be a groove in a wall of the first element. The passage can be provided flexibly within the vehicle interior fixture.

Provided within the passage are solid bodies that are in contact with one another and create a row. As defined by the invention, row denotes the fact that the solid bodies are arranged back-to-back or staggered in a string within the passage. As defined by the invention, the term row can, for example also denote the fact that the solid bodies are arranged in completely disordered fashion within the passage. A plurality of solid bodies, for example is provided in the passage. The passage forms, for example a closed loop. The passage is, for example filled completely with the solid bodies. The solid bodies, for example form a closed loop or, for example a closed chain. Chain as defined by the invention can denote, for example the fact that the solid bodies create an annular string. The term chain, as defined by the invention, means that the solid bodies are attached to each other; however, the term can also mean that the solid bodies are not attached to each other. The solid bodies are, for example only in lose contact with each other. In other words, in this case they are not attached to each other.

The solid bodies are movable relative to the passage, or the row of solid bodies is movable relative to the passage. The solid bodies are guided for example by the walls of the passage.

Forces, in particular, compression forces, can be transmitted between the solid bodies that are in contact. For example, pressing forces but no tension can be transmitted between the solid bodies. The solid bodies are, for example in contact in such a way that all of the solid bodies can be moved within the passage in response to the driving force effective on one of the solid bodies. The solid bodies of the passage, in particular, create a closed loop. Each solid body can, for example be driven by the row.

The row functions for example to bridge the path between the site of the driving force for the row and the site at which at least one solid body bears on the second element or the first element, thereby enabling an adjustment to be effected. At least one solid body can bear either directly or indirectly on the second element and/or the first element. For example, a first solid body has an arm by which it bears on the second and/or the first element. The solid body bears, for example on the adjustment element and/or the drive element.

One advantage of the invention consists in the fact that the adjustment mechanism of the vehicle interior fixture according to the invention enables the actuator to be provided at any desired location within the vehicle fixture regardless of the actual site of support between the first element and the second element. Adjustment by a solid body row or a solid body string is functionally reliable and allows the solid bodies to be guided flexibly within the vehicle interior fixture. The passage can, for example lie in one plane, or alternatively can be three dimensional. Two straight regions of the passage form, for example an angle of a ≤180°, in particular, ≤90°. The passage can extend, for example around at least one curve. The passage can be provided in such a way as to take up very little space within the vehicle interior fixture.

In a first embodiment, the row or string is essentially incompressible. For example, the solid bodies of the row are essentially incompressible. The path that is taken by a driving solid body in indirect or direct contact with the drive element is also taken by the adjusting solid body in indirect or direct contact with the adjustment element. There is no difference or only an inconsequential difference between the path of the driving solid body and the path of the adjusting solid body. An elastically deformable element can be integrated in the row, for example in order to compensate for required tolerances relating to temperature-dependent changes in the size of the solid bodies.

In another embodiment, the at least one adjustment element supported on the second element is integrated into the row. The solid body has, for example an arm that itself bears on the second element. The adjustment element can, for example be attached to the second element, one region of which can be integrated into the row. The region of the adjustment element is in contact, for example with at least one solid body, in particular, with two solid bodies. The passage has, for example a slot in the region of movement for the adjustment element, the adjustment element, in particular, with the arm of the adjustment element passing through the slot.

In one embodiment, at least one solid body is in contact with a drive element by which the row can be driven. The drive element is part of a drive by which at least one row can be driven. The drive element can be provided, for example in the form of a drive wheel or drive rod. At least one structure is provided, for example in the drive wheel or the drive rod, that is of a shape complementary to that of the outer surface of the solid body, and that can be engaged in form-fitting fashion with at least one of the solid bodies. The drive element itself can in turn be for example driven by a motor, for example an electric motor.

The adjustment mechanism can comprise, for example at least two rows. For example, a first row can include a first adjustment element that interacts with a first support rod, while a second row includes a respective second adjustment element that interacts with a second support rod of a headrest.

In another embodiment of the invention, the drive element drives at least one row. As was mentioned above, the adjustment mechanism can comprise two or more rows. Both rows are driven, for example by a single drive element. For example, a first region of a drive wheel is in contact with the first row, while a second region of the drive wheel is in contact with the second row. The second region is located, for example diametrically opposite the first region. Alternatively, it is also possible to provide multiple drive elements for the row of solid bodies of one passage or for the rows of solid bodies of at least two passages. Multiple passages, for example can each be provided with a respective row of solid bodies. A separate drive element can be associated with each of these passages, or multiple drive elements can be associated with each of these passages.

In another embodiment of the invention, at least one solid body is a ball. A ball can advantageously move within the passage without jamming. In addition, it is readily possible by simple means for a ball to engage a drive element in form-fitting fashion. Once the row of balls has been formed, the frictional resistance of the row within the passage is low. A transmission of force is easily possible by a row formed by balls even when the row is guided through curves and around corners. Alternatively, the solid bodies can also be free-form pieces or other geometric shapes, such as for example cuboids, cubes, polyhedrons (for example spherical polyhedrons).

The diameter of the solid body generally matches, for example the flow cross-section of the passage. According to the invention, this means that the solid body is of approximately the same width as the passage in a plane perpendicular to the direction of flow of the row. The balls in this case cannot be arranged in staggered fashion relative to the direction of flow. Fewer balls are required in order to produce the desired length of the row. In addition, the fraction of adjustment force transmitted is greater in the direction of flow. In an alternative embodiment, the flow cross-section of the passage is larger than a solid body, thereby allowing the solid bodies to be staggered back-to-back, or alternatively also provided adjacent to each other.

The vehicle interior fixture can be, for example a headrest of a vehicle seat where the first element or the second element is a height-adjustable and movable head-support part, while the second element or the first element is a support rod headrest or the backrest of the vehicle seat. The headrest includes, for example a movable head-support part that is supported on a base element, the base element being mounted on support rods. The movable head-support part can be supported, for example horizontally or vertically relative to the base element. The base element in this case can form the first element or the second element.

BRIEF DESCRIPTION OF THE DRAWING

Additional advantages of the invention are described with reference to illustrated embodiments that are shown in the figures. Therein.

SPECIFIC DESCRIPTION OF THE INVENTION

Figure 1:
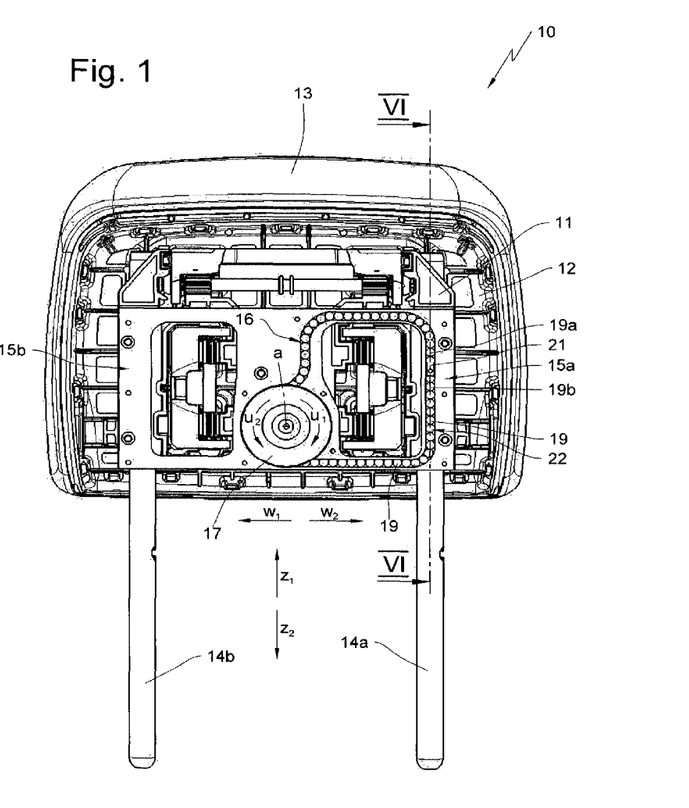
FIG. 1 is a schematic rear view of the headrest, a rear cover panel not being illustrated for the sake of clarity.

A complete headrest in FIG. 1 is identified at 10. Identical reference numerals in the figures refer to corresponding components, including where lowercase characters are added.

The headrest 10 comprises a base part 11 to which a movable head-support part 12 is attached. The movable head-support part 12 is provided with a cushion 13. The headrest 10 can be attached to a backrest, not shown, of a vehicle seat by support rods 14a and 14b. The mount for the base part 11 on the support rods 14a and 14b is formed by guides 15a and 15b that are provided on the base part 11. The base part 11 can be moved by the guides 15a and 15b relative to the support rods 14a and 14b in vertical directions $z_1$ and $z_2$.

Figure 4:
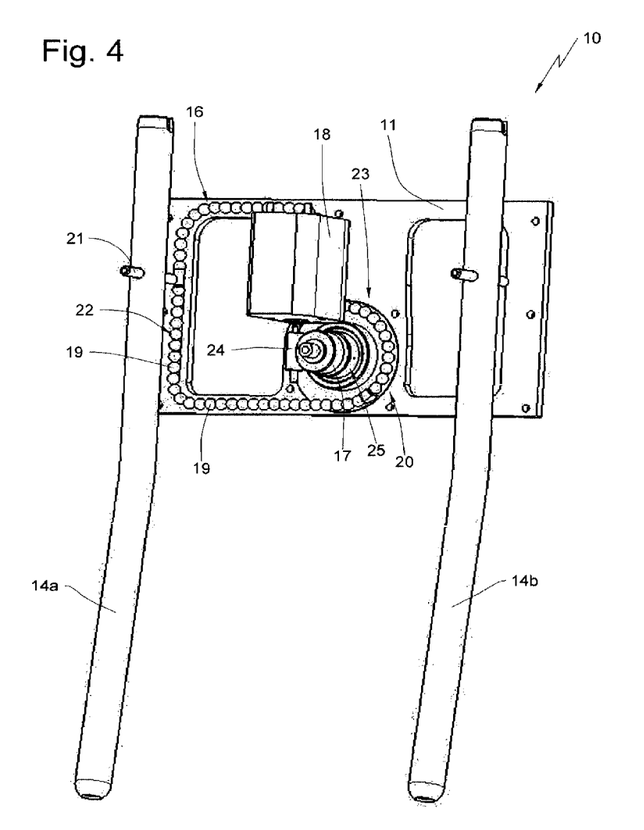
FIG. 4 is a schematic perspective front view of the headrest in the lower end position, various components of the headrest not being shown.
Figure 5:
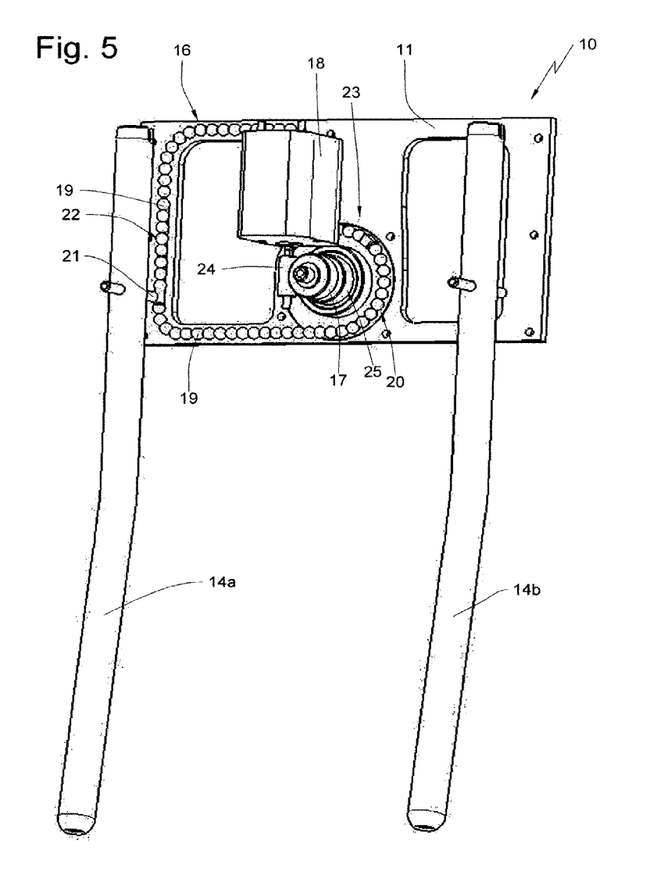
FIG. 5 is a view like FIG. 4 but shows the headrest in the upper end position.
Figure 6:
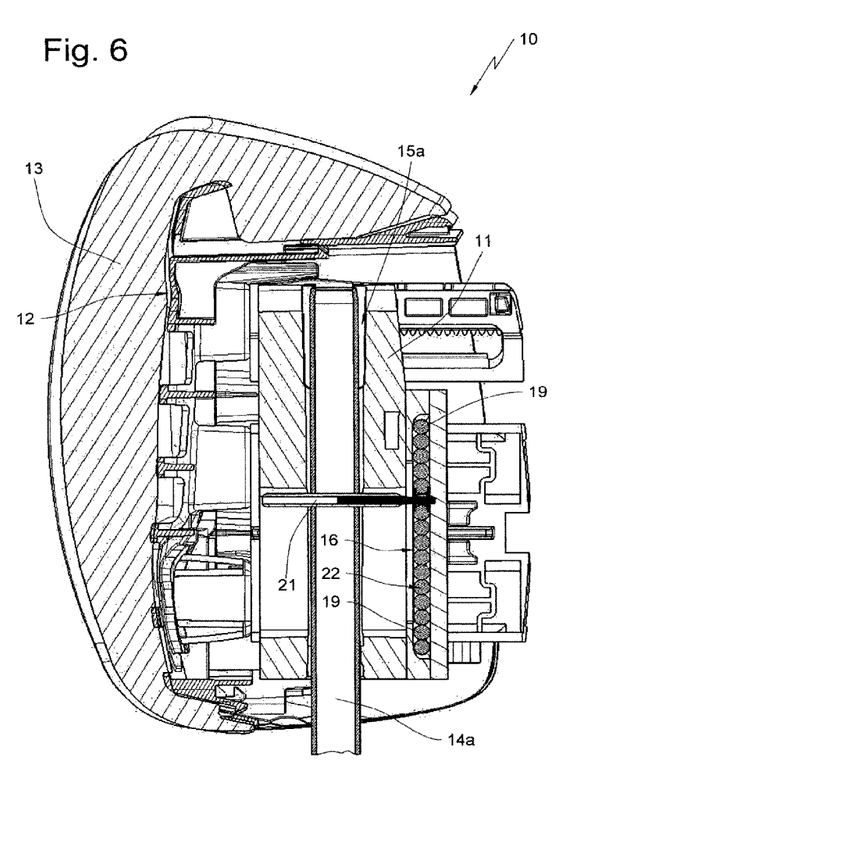
FIG. 6 is a schematic longitudinal section taken along line VI-VI of FIG. 1.

Movement of the base part 11 in the directions $z_1$ and $z_2$ is effected by an adjustment mechanism that comprises a flow passage formed as a groove 16. The groove 16 holds solid bodies in the form of balls 19 that essentially form an incompressible ball string 22. The string of balls can be moved along the groove 16 by a drive wheel 17 that is drivable by a motor 18 (see, for example FIG. 4). The motor 18 drives a worm gear 24 that engages a gear wheel 25 of the drive wheel 17. An adjustment element 21 is integrated into the string of balls between balls 19a and 19b. The adjustment element 21 is permanently affixed to the support rod 14a.

Figure 2:
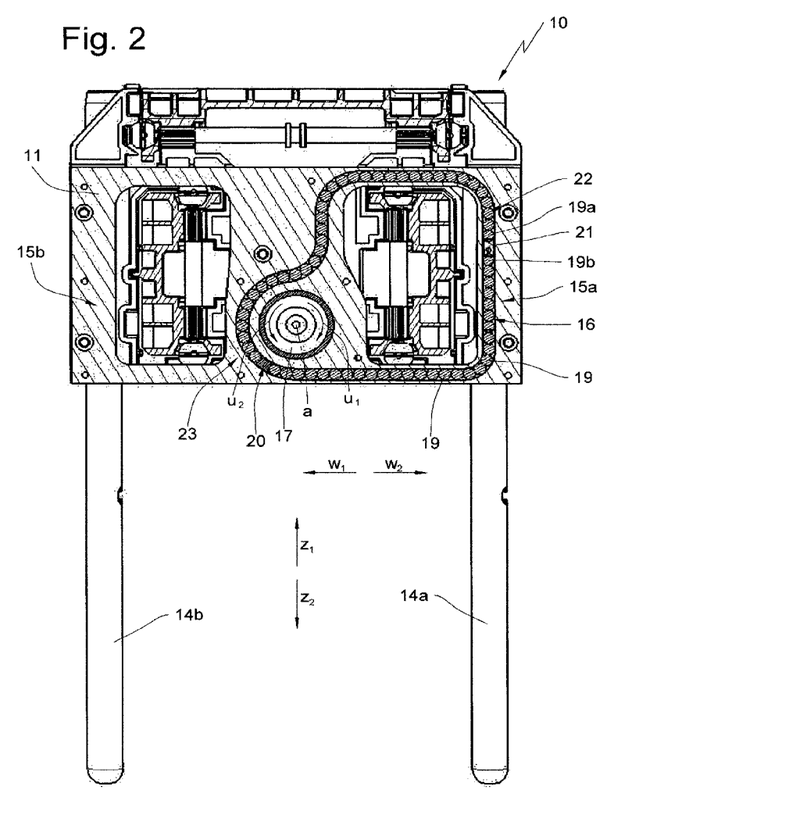
FIG. 2 is a schematic section through the headrest in FIG. 1 when in a lower end position, a movable head-support part and a head cushion not being shown.

The base part 11 in FIG. 2 is shown without the movable head-support part 12. The base part 11 is located in a first lower end position in FIG. 2. Movement in the upward direction $z_1$ moves the base part 11 toward a second upper end position shown in FIG. 3. Movement in the downward direction $z_2$ moves the base part 11 from the second end position to the first end position. The base part can furthermore be moved steplessly into positions between the first and second end positions.

The ball string 22 is driven by the drive wheel 17 that forms a wall 16 of the groove 16 in a limited region 23 of the groove 16. A structure 20 complementary to the ball string is molded into the drive wheel 17, thereby enabling the drive wheel 17 to engage in a form-fitting manner at least one, in particular, multiple balls 19 of the string 22 and to displace all these balls 19.

Whenever the drive wheel 17 is rotated in a direction $u_1$ about a pivot axis a, starting from the first position of the base part 11 shown in FIG. 2, a transport motion is effected for the ball string 22 in a transport direction $w_1$. At the same time the adjustment element 21 moves in this direction $w_1$ relative to the base part 11 so the base part 11 moves in the direction $z_1$ relative to support rod 14a. Maximum adjustment of the base part 11 in the direction $z_1$ into the second end position is possible, as indicated in FIG. 3.

If no driving force by the drive wheel 17 is present, the base part 11 remains in the set position. Self-locking by the motor 18 and by a transmission between the motor 18 and the drive wheel 17 prevents any unintentional adjustment out of the set position of the base part 11.

Figure 3:
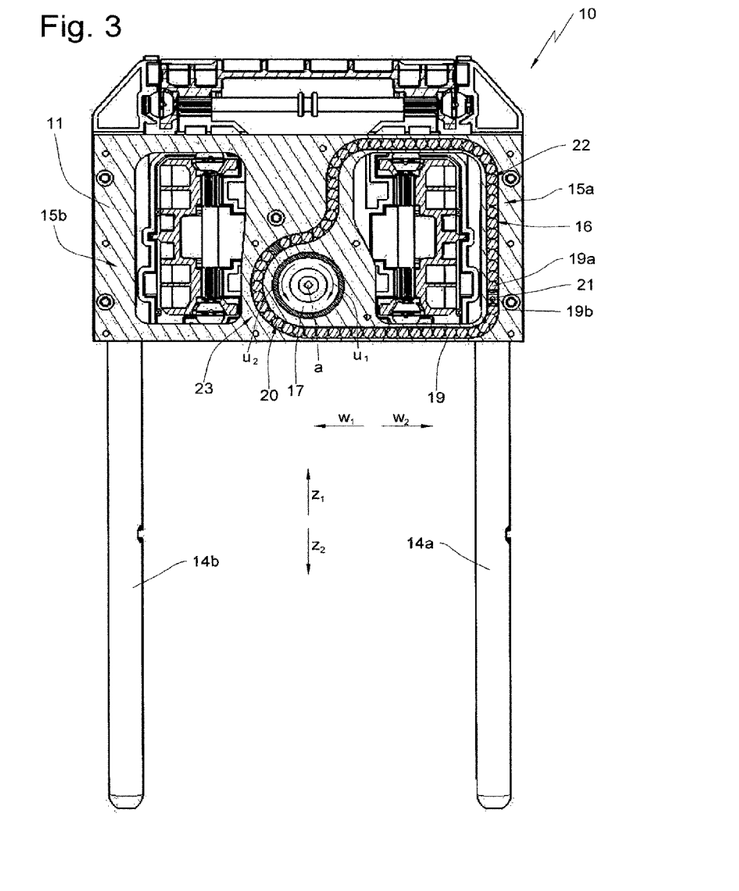
FIG. 3 is a schematic section through the headrest in FIG. 2 in the upper end position.

Whenever the base part 11 is to be adjusted, for example in the direction $z_2$ from the position shown in FIG. 3, the drive wheel 17 is rotated by the motor 18 in direction $u_2$. As a result, the ball string 22 moves in transport direction $w_2$ relative to the base part 11. At the same time, the adjustment element 21 is moved in the direction $w_2$ while the base part 11 is displaced in the direction $z_2$.

Figure 7:
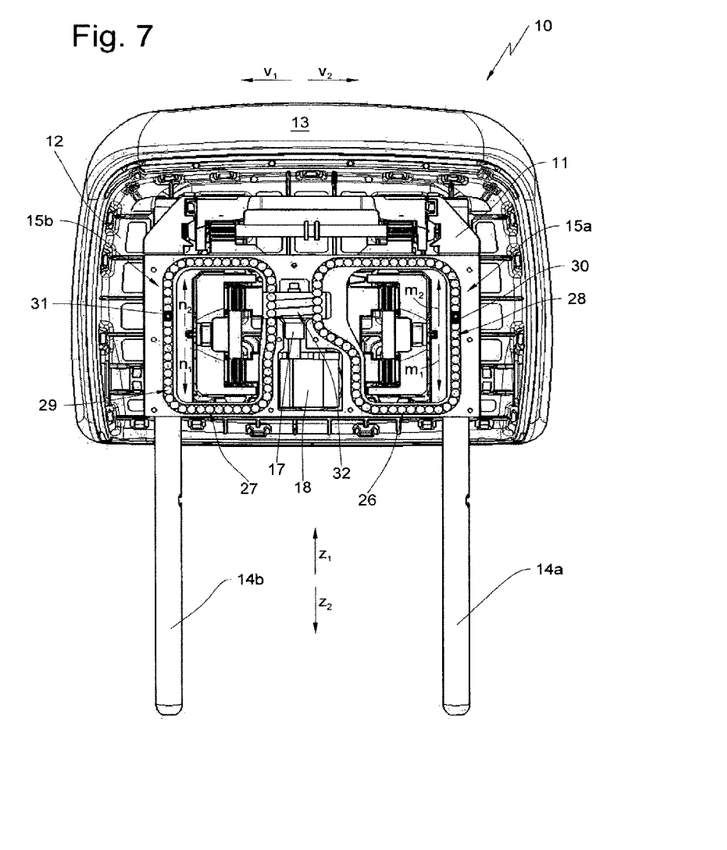
FIG. 7 is a schematic rear view of another embodiment of the headrest, a rear cover panel not being shown for the sake of clarity.
Figure 8:
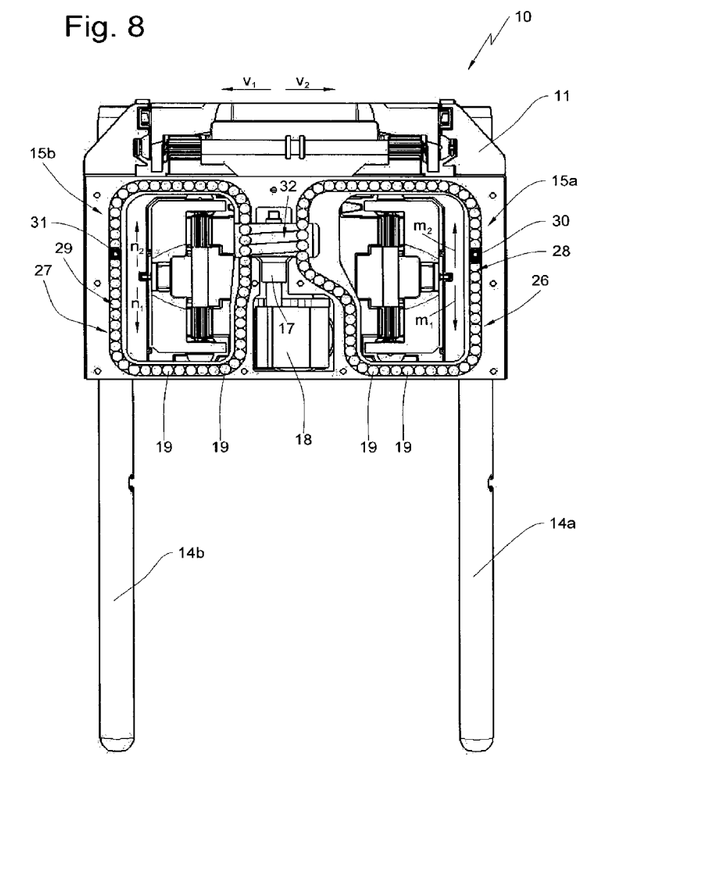
FIG. 8 is a schematic view of the headrest in FIG. 7, whereby a movable head-support part is not shown.
Figure 9:
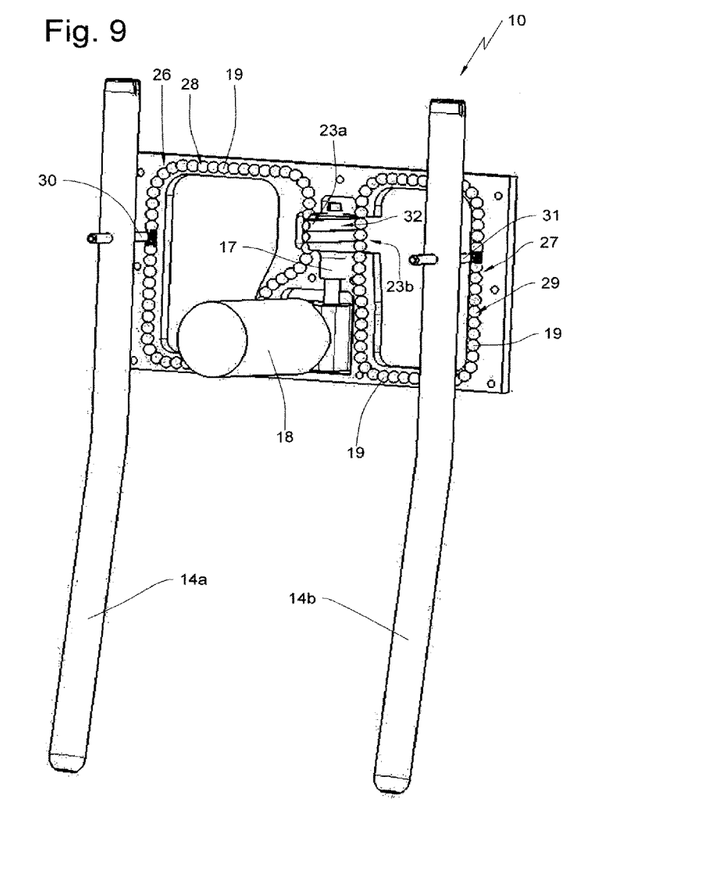
FIG. 9 is a schematic perspective front view of the headrest, various components of the headrest not being shown.

Another embodiment of headrest 10 is shown in FIGS. 7 through 9. The base part 11 forms grooves 26 and 27. A ball string 28 formed by balls 19 is provided in the groove 26, while a ball string 29 formed by the balls 19 is provided in the groove 27. An adjustment element 30 is integrated in the ball string 28, while an adjustment element 31 is integrated in the ball string 29. The adjustment element 30 is permanently attached to the support rod 14a, while the adjustment element 31 is permanently attached to the support rod 14b. The drive wheel 17 provided in the form of a worm gear 32 engages the balls 19 of the ball strings 28 and 29.

Whenever the drive wheel 17 is rotated by the motor 18 in direction $v_1$, the ball string 28 moves in a direction $m_1$ and ball string 29 moves in a direction $n_1$. The base part 11 is moved in the direction $z_1$. When the drive wheel 17 rotates in the reverse direction $v_2$, the ball string 28 moves in a direction $m_2$ while the ball string 29 moves in a direction $n_2$. The base part 11 is then moved in the direction $z_2$.

The invention claimed is:

1. A vehicle interior fixture comprising:
   a first element;
   a second element movable relative to the first element; and
   an adjustment mechanism that can move the first element relative to the second element, that is carried on the first element and that has
      at least one passage,
      a row or string of solid bodies in contact with one another, guided in and extending along the passage, and movable relative to the passage, at least one of the solid bodies bearing on the second element, and
      a drive element engaging the row or string of solid bodies at a location offset from the one body bearing on the second element and movable for pushing the row or string and thereby transmitting force by compression through the row or string to the one body and the second element to displace same.

2. The vehicle interior fixture according to claim 1, wherein the solid bodies are in loose contact.

3. The vehicle interior fixture according to claim 1, wherein the solid bodies are substantially incompressible.

4. The vehicle interior fixture according to claim 1, wherein one of the first and second elements is a horizontally movable head-support part of a headrest of a vehicle seat and the other of the first and second elements is a base part of the headrest that is mounted on a backrest of the vehicle seat.

5. The vehicle interior fixture according to claim 1, further comprising:
   at least one adjustment element integrated in the string or row and bearing on the second element.

6. The vehicle interior fixture according to claim 1, wherein one of the elements is a height-adjustable and movable head-support part of a headrest for a vehicle seat and the other of the elements is a support rod of the headrest or of a backrest of the vehicle seat.

7. The vehicle interior fixture according to claim 1, wherein each solid body is a ball.

8. The vehicle interior fixture according to claim 1, wherein a diameter of each of the solid bodies generally matches a flow cross-section of the passage.

9. The vehicle interior fixture according to claim 1, wherein the adjustment mechanism includes at least two of the passages each holding a respective string or row and the adjustment mechanism includes two of the drive elements each engaging in a respective one of the passages with the respective string or row.

10. The vehicle interior fixture according to claim 1, wherein the passage forms a closed loop.

11. The vehicle interior fixture according to claim 10, wherein the solid bodies form an annular string.

* * * * *